Figure 3:
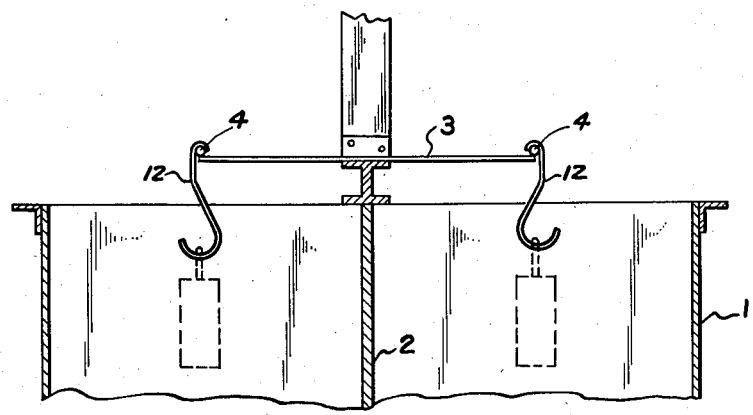

July 14, 1959 J. V. DAVIS 2,894,517
WORK-HANDLING APPARATUS
Filed March 29, 1955 4 Sheets-Sheet 1
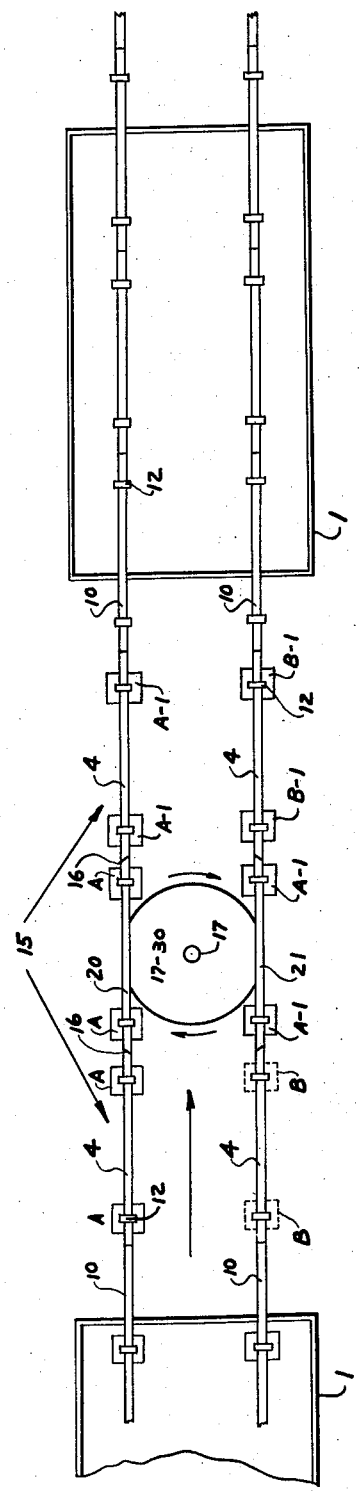
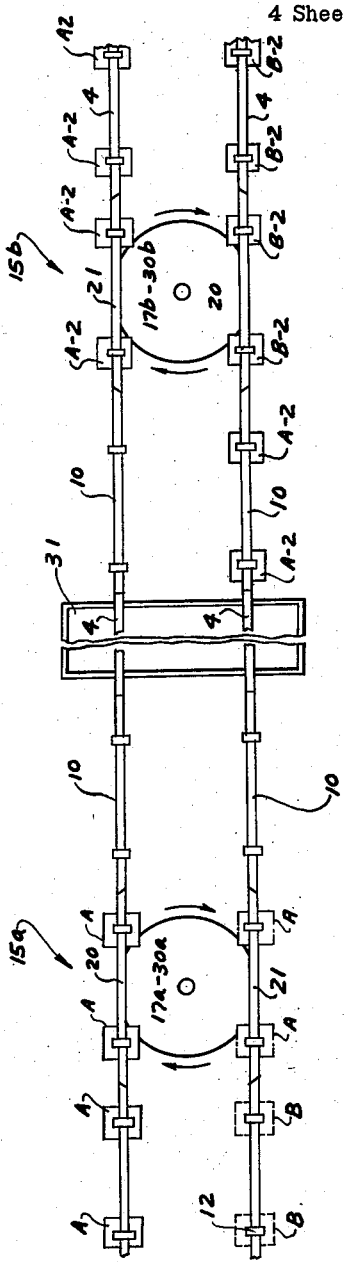
INVENTOR.
JOHN V. DAVIS
BY
ATTORNEY.

July 14, 1959  J. V. DAVIS  2,894,517
WORK-HANDLING APPARATUS
Filed March 29, 1955  4 Sheets-Sheet 2

INVENTOR.
JOHN V. DAVIS
BY
ATTORNEY.

INVENTOR.
JOHN V. DAVIS

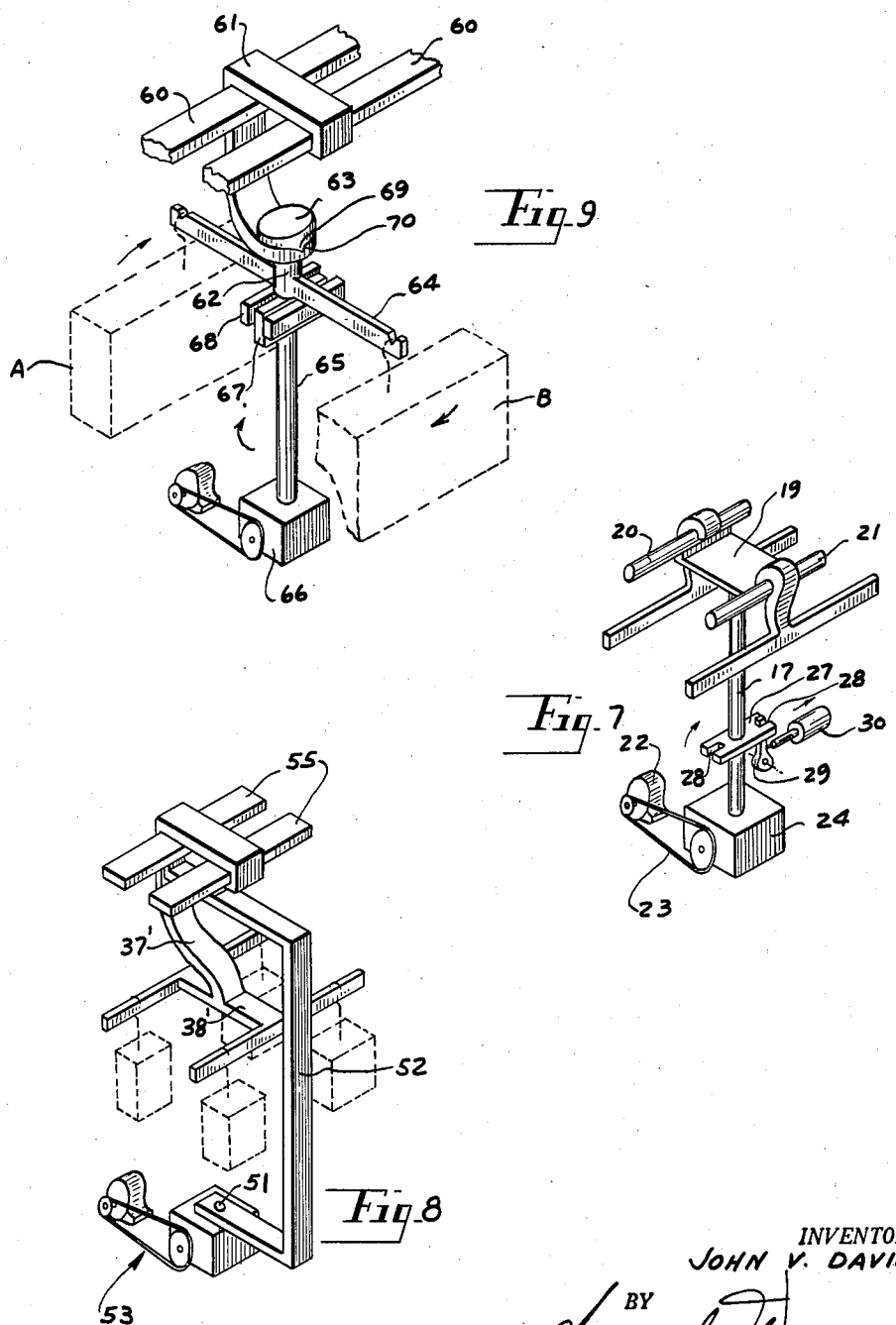

United States Patent Office
2,894,517
Patented July 14, 1959

2,894,517
WORK-HANDLING APPARATUS

John V. Davis, Detroit, Mich., assignor to The Udylite Corporation, Detroit, Mich., a corporation of Michigan Application March 29, 1955, Serial No. 497,784

8 Claims. (Cl. 134—77)

The present invention pertains to a novel work-handling apparatus for use in installations, such as return-type plating machines, in which work is moved along a rail system for a succession of operations thereon.

It has been found economical to move the work in a double row, either on a pair of rails or on a single rail with double carriers slidable thereon.

The operators usually stand at a given side of the installation, especially in the case of an installation having an endless path for the work. Consequently it is difficult to reach the more remote row of work for loading and unloading.

The principal object of this invention is to facilitate loading and unloading under these conditions and is accomplished generally by means of a work-shifting device that moves finished work from the more remote row to the nearer row and freshly loaded work from the nearer row to the more remote row.

More particularly, a rotary carrier or segment in the rail system is provided at the loading and unloading station. The finished work is removed by the operators from the nearer row before reaching the rotary carrier, and the finished work on the more remote row is transferred to the carrier or segment. The removed work is replaced with fresh work either before or after transfer to the carrier or segment. The carrier or segment is now rotated 180°, thereby bringing the finished work into the nearer row and the new work into the more remote row. This remaining finished work may now be removed and replaced with new work at the side of the machine where the operators stand.

Where the work carriers require stripping, such a station with a rotary segment is provided at each side of the strip tank. At the first station the work is removed first from one row and then from the other, but no new work is loaded here. After the carriers have been stripped and put into the conveying system at the second station, work is loaded first into one row and then into the other and propelled through the machine for a cycle of operations.

The invention is fully disclosed by way of example in the following description and in the accompanying drawings in which Figure 1 is a diagrammatic view of the apparatus;
Figure 2 is a diagrammatic view of a modification;
Figures 3, 4, 5 and 6 are cross sections of tank systems showing in elevation various work supporting structures, and
Figures 7, 8 and 9 are perspective views of three forms of work turning devices.

Reference to these views will now be made by use of like characters which are employed to designate corresponding parts throughout.

In Figure 1 is shown a series of plating or similar tanks 1 arranged preferably in an endless pattern for continuous movement of the work as known in the art. The pattern, for example, consists of two parallel laps, with the conveying mechanism extending above and along the laps, and made continuous at the ends thereof as also known in the art. For the purpose of the present invention, only one lap need be considered.

Along this lap are provided one or two cathode rails. In each case, work pieces or work carriers are supported at opposite sides of the longitudinal center line of the row of tanks, and in fact the invention is related to this particular arrangement of the work.

The double rail system in a row of tanks will be described first. Each of the parallel rails consists of fixed segments and vertically movable segments for use in transferring the work from tank to tank 1 as shown in my U.S. Patent No. 2,479,322, of August 16, 1949. For the support of the fixed segments, T-members 2 are mounted at spaced positions in or between the tanks on the longitudinal center. The heads 3 of these members extend transversely of the tanks and carry the fixed segments 4 on the ends thereof.

Figure 4:
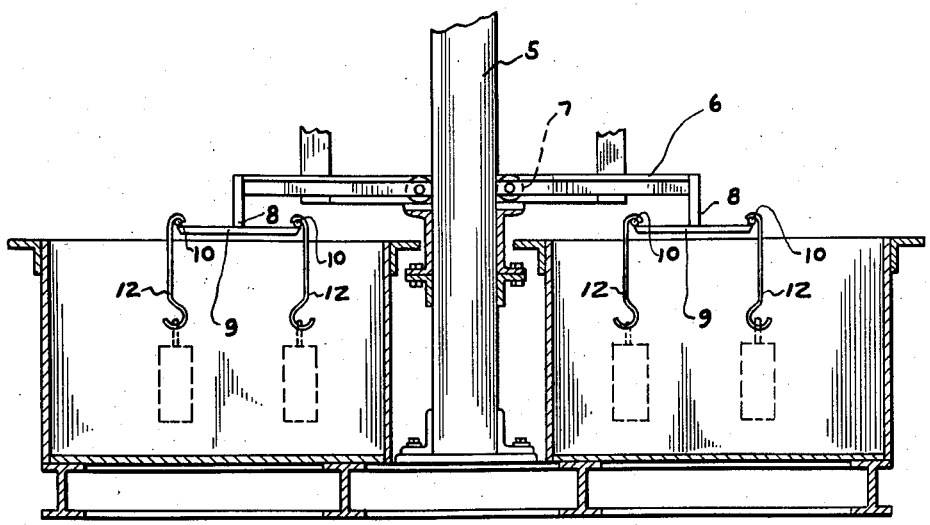

The vertically movable segments of two adjacent rows of tanks are guided on structural columns 5 mounted between the two laps of tanks as shown in Figure 4. A carriage or chassis, illustrated in part and designated by the numeral 6, rides on the post or posts 5 which are engaged by the rollers 7. The chassis extends preferably along the entire length of the tank 6. Complete devices for this purpose as well as the means for raising and lowering them are shown in the aforementioned patent and also in my U.S. Patent No. 2,650,600 of September 1, 1953. A hanger 8 is suspended from the chassis 6 over each row of tanks to carry a cross bar 9 on which the vertically movable rail segments 10 are supported. These segments aline with the fixed segments 4 to form continuous rails.

On each of the rails is slidably mounted a series of work carrier hooks 12 from which in turn are suspended work pieces or carrier racks designated as A on one of the rails and B on the other rail. A suitable mechanism moves the hooks 12 along the rails as shown, for example, in the two aforementioned patents and therefore not illustrated here inasmuch as it is not a part of the instant invention.

A space or station 15 devoid of tanks is provided in the tank system and receives two fixed segments 4 of each rail spaced apart at 16 to receive a work shifting device for moving work out of alinement with one of the rails into alinement with the other rail. This device comprises, generally, rail segments movable in the manner described by means of a rotary mechanism.

A form of such mechanism is illustrated, by way of example, in Figure 7. It comprises a vertical shaft 17 disposed in the center of the space 16 and suitably journalled. The upper end of the shaft carries a frame 19 carrying rail segments 20 and 21 adapted to aline with the aforementioned spaced rails 4. A motor 22 is geared at 23 to a gear box 24 from which the shaft 17 is driven. The shaft 17 also carries a latch bar 27 having both ends notched at 28 to receive a pivoted latch finger 29 which in turn is operated by a solenoid 330 or equivalent device. The motor 22 and solenoid 30 are controlled by suitable manual or automatic means (not shown).

The station 15 may be used for unloading and loading or for unloading alone, and the operation will be described first in connection with the unloading and loading. The work pieces B are removed from the corresponding segment 4 on the approach side of a work shifting device 17—30. The pieces or racks B are on the outer side of the tank series or where the operator stands. In the diagram shown in Figure 1 the pieces B are illustrated in dotted lines to indicate that they have been removed. They are replaced by new pieces A-1, A-1 shown on the segment 21 after having been shifted simultaneously with the first pieces A, A to the segments 21 and 20 respectively, as shown. The work shifting device 17—330 with segments 20, 21 is then turned 180° and latched by the mechanism described. The pieces A, A are now on the operator's side of the system and are replaced by pieces B-1, B-1 either at the segment 20 or after a shift to the alined segment 4. In either case, after the shift the pieces A-1, A-1 and B-1, B-1 are on the respectively alined segments 4 on the departure side of station 15, ready to be passed through the tanks 1 for the cycle of operations to be performed therein. Both the unloading and loading may be performed at the one station 15 when the work carrier or rack need not be stripped.

When the work carriers or racks must be stripped, two stations 15a and 15b structurally similar to the station 15 are provided at a relatively short distance apart, with a strip tank 31 intervening. This operation is illustrated in the diagram shown in Figure 2. At the station 15a, on the approach side of the shifting device 17a—30a, the piece B, B shown dotted are removed but not replaced. The pieces A are moved to the device 17a—30a which is then turned 180° in the manner described. The pieces A, A now on the operator's side are removed directly from the segment 21 or after a shift to an alined rail segment 10. Vertically movable segments 10 are provided at both ends of the strip tank 31 for movement of the carriers 12 into and out of the tank. There are now no work pieces between station 15a and tank 31.

In the raised position of the segments 10 either at the tank 31 or any of the tanks 1, the work carrier hooks 12 are shifted over the end walls of the tanks by a transfer mechanism such as shown in either of the aforementioned patents.

Between the tank 31 and the shifting device 17b—30b of the station 15b new pieces A-2, A-2 are loaded on the segment 10 of the outer rail, i.e., at the operator's side. They are next shifted to this device, which is then turned 180° and so shown. New pieces B-2, B-2 are mounted on segment 20 or on the alined segment 4 after a shift. In either case, after the shift the segments 4 carry work pieces on the departure side.

At the end of the cycle, the work returns to station 15 or 15a as the case may be and is unloaded and replaced with new work in the manner already described. In order to permit rotation of the segments 20 and 21, the immediately adjacent ends of the adjacent rail segments are bevelled as shown in approximation of the radius of rotation of the units 17—30, 17a—30a and 17b—30b.

Figure 5:
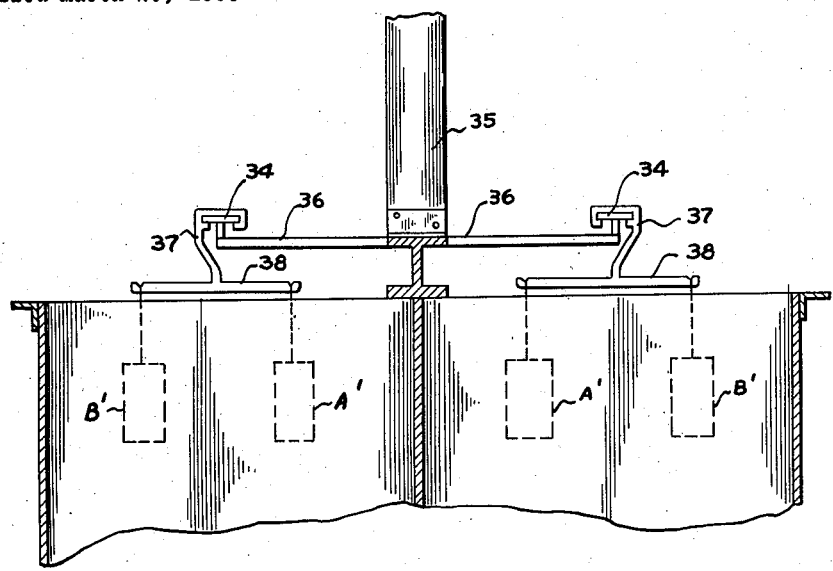

The modification shown in Figure 5 discloses a single rail rather than a double rail running along each row of tanks. The fixed segments 34 are supported from structural columns 35 by means of arms 36 extending over both laps of the tank series, as shown for example in Figure 7, of Patent No. 2,650,600. Carrier hooks 37 are slidably mounted on the rails, and since the invention involves a double row of work along each row of tanks, each such hook has a cross arm 38 having work pieces or racks A' and B' suspended from the ends thereof.

Figure 6:
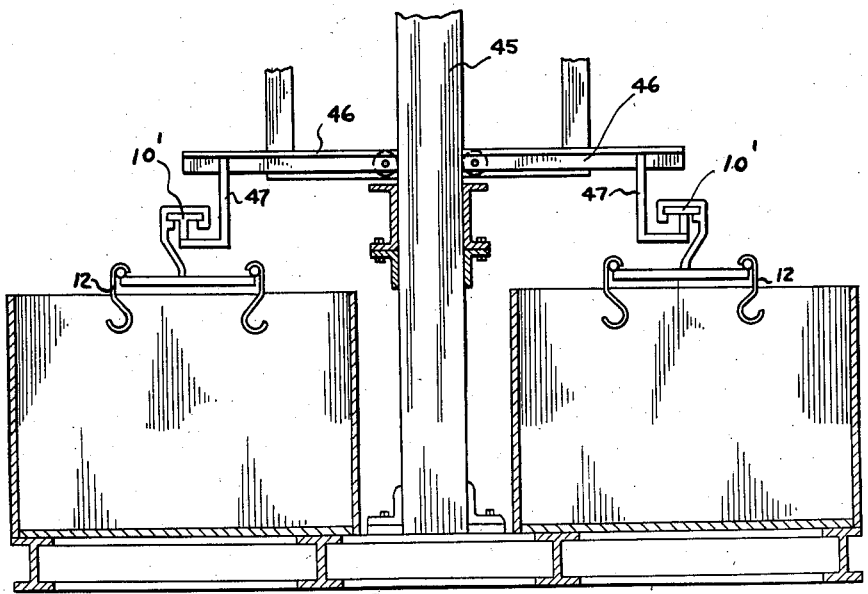

For the vertically movable rail segments, as shown in Figure 6, other columns 45 carry a vertically movable chassis 46 having suitable underslung brackets 47 that carry the vertically movable segments 10'. The means for actuating the chassis and for propelling the hooks 37 along the rails are substantially as disclosed in the aforementioned patents.

The work rotating devices in this system are located in the manner previously described but require a different construction as shown in Figure 8. Each device includes a stub shaft 51 on which is journalled a laterally and vertically disposed U-frame 52. The shaft 51 is driven by mechanism 53. The upper end of the frame 62 carries the shifting or rotatable segment 55 so positioned that it turns on a fixed center co-axial with the shaft 51.

Carrier hooks 37' with cross arms 38' are shifted to the segments 55, here shown as slit lengthwise, and rotated therewith in the manner already described.

In the modification shown in Figure 9 the work carrier rotates independently of the rail segments. The rail comprises two parallel strips 60 but is in fact a single rail inasmuch as each sliding hook 61 straddles and rides on both strips.

From the lower portion of the hook is rotatably suspended a pin 62 maintained on the hook by a head 63. A cross arm 64 is welded to the pin 62 to carry two opposed work pieces A and B in two rows as previously described.

Below the pin 62 is an alined rotatable shaft 65 driven intermittently by a mechanism 66 in the manner previously described. The shaft carries a key 67 which is received in a clevis 68 when the hook assembly 61—64 moves to the station where the arm 64 is to be swung around.

The head 63 is formed with opposed teeth 69 (only one being shown) engageable in a notch 70 in the hook 61 to establish two settings of the pin 62 180° apart for unloading and loading as described in connection with the preceding embodiments.

The loading and unloading, instead of being done manually as described, may be performed by means of the machine disclosed in my Patent No. 2,645,186 of July 15, 1953.

Although specific embodiments of the invention have been illustrated and described, it will be understood that various alterations in the details of construction will be made without departing from the scope of the invention as indicated by the appended claims.

What I claim is:

1. In a work-handling apparatus which includes a rail system having fixed aligned rails, and work-carrying means for pairs of workpieces, the workpieces in each pair being spaced apart transversely of said system, said work-carrying means being mounted on the rail system for movement therealong, a movable rail segment interposed in said system between fixed aligned rails, means movably mounting said movable rail segment for rotatable movement between two stop positions disposed 180 degrees apart for interchanging the positions of the workpieces in a pair supported thereon, means operatively associated with said movable rail segment for defining said stop positions, said movable rail segment in both of said stop positions being disposed in alignment with said last-mentioned fixed aligned rails so that workpieces are movable onto and off said movable rail segment from and to, respectively, said fixed aligned rails.

2. In a work-handling apparatus, a rail, a work-carrier slidably mounted thereon and having a pair of work-suspension devices spaced apart transversely of said rail, a strip tank under a portion of said rail, a separate segment in said rail at each side of said tank, rotary mountings for said segments having their axes in the centers of the respective segments, and means for intermittently rotating said segments through angles of 180° for interchanging the positions of said pair of work-suspension devices.

3. In a work-handling apparatus, a pair of parallel rails arranged in a side-by-side relation, work carriers slidably mounted on said rails and arranged in pairs, one of the work-carriers in each pair being supported on each of said rails, opposed separate segments in said rails, a frame joining said segments, a rotary mounting for said frame having its axis in the center of said frame, means for intermittently rotating said frame through angles of 180 degrees for interchanging the positions of said pair of work-carriers, and latch means operatively associated with said frame for stopping the rotation of said frame after each said 180 degree intermittent rotation thereof.

4. In a work-handling apparatus, a pair of mutually adjacent, parallel rails, work carriers slidably mounted thereon, a strip tank under a portion of said rails, opposed separate segments in said rails at opposite ends of said tank, a frame joining each pair of segments, a rotary mounting for each frame, having its axis in the center of the corresponding frame, and means for intermittently rotating said frames.

5. In a work-handling apparatus, a series of tanks, a rail system above and along said tanks, work-carrier means slidably mounted on said rail system and having work-suspension devices spaced apart transversely of said system, a separate segment aligned in said system, a rotary mounting for said segment having its axis in the center of said segment, and means for intermittently rotating said segment through angles of 180°.

6. In a work-handling apparatus, a series of tanks, a rail system above and along said tanks, work-carrier means slidably mounted on said rail system and having work-suspension devices spaced apart transversely of said system, a given tank in said series being spaced from the adjacent tanks to provide two tank-free stations, a separate segment alined in said system at each station, rotary mountings for said segments having their axes in the centers of the respective segments, and means for intermittently rotating said segment through angles of 180°.

7. In a work-handling apparatus, a horizontal rail, work-suspension devices slidably mounted on said rail and adapted to support work pieces in pairs transverse of said rail, each work-suspension device comprising a hook slidable on said rail, a vertical pin rotatable in said hook, a cross bar fixed to said pin and adapted to carry a pair of work pieces, a vertical shaft on a fixed axis, means on said pin for making driving engagement with said shaft, and means for intermittently rotating said shaft through 180°.

8. In a work-handling apparatus, a horizontal rail, work-suspension devices slidably mounted on said rail and adapted to support work pieces in pairs transverse of said rail, each work-suspension device comprising a hook slidable on said rail, a vertical pin rotatable in said hook, a cross bar fixed to said pin and adapted to carry a pair of work pieces, a vertical shaft on a fixed axis, said shaft being positioned for axial alinement with said pin on movement of the latter with said hook, complementary clutch parts carried by said pin and shaft, and means for intermittently rotating said shaft through 180°.

References Cited in the file of this patent
UNITED STATES PATENTS

| | | |
|---|---|---|
| 527,322 | Crosby | Oct. 9, 1894 |
| 2,048,938 | Larson | July 28, 1936 |
| 2,090,135 | Linder | Aug. 17, 1937 |
| 2,479,322 | Davis | Aug. 16, 1949 |
| 2,591,681 | Davis | Apr. 8, 1952 |
| 2,591,682 | Davis | Apr. 8, 1952 |
| 2,650,600 | Davis | Sept. 1, 1953 |
| 2,681,015 | Davis | June 15, 1954 |